UNITED STATES PATENT OFFICE.

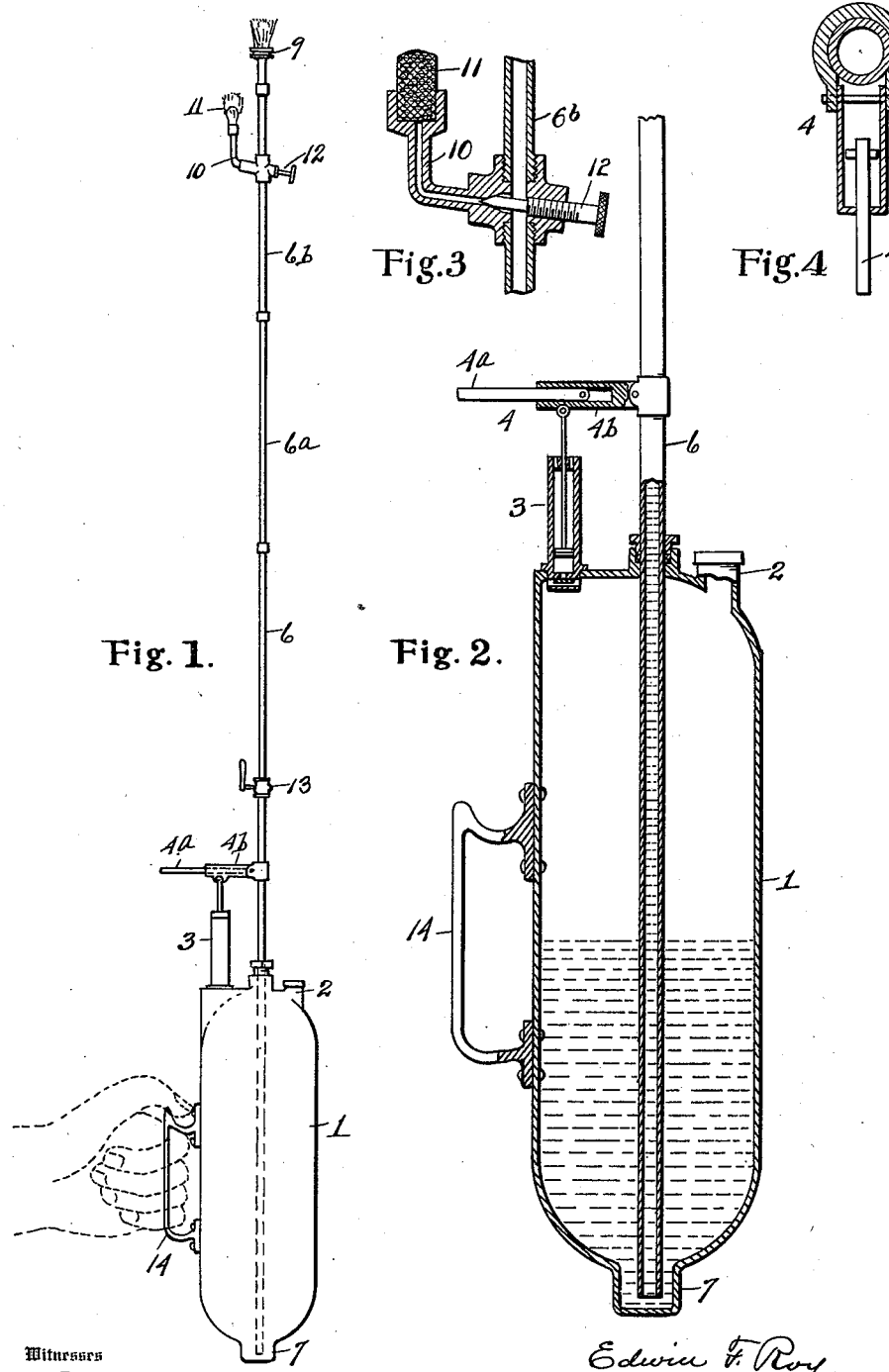

EDWIN F. ROY, OF DETROIT, AND THEODORE ARGLEBEN, OF DEARBORN, MICHIGAN.

SPRAYING-TORCH.

1,008,733.  Specification of Letters Patent.  Patented Nov. 14, 1911.

Application filed December 30, 1910. Serial No. 600,128.

*To all whom it may concern:*

Be it known that we, EDWIN F. ROY and THEODORE ARGLEBEN, citizens of the United States, residing at Detroit and Dearborn, respectively, county of Wayne, State of Michigan, have invented a certain new and useful Improvement in Spraying-Torches, and declare the following to be a full, clear, and exact description of the same, such as will enable others skilled in the art to which it pertains to make and use the same, reference being had to the accompanying drawings, which form a part of this specification.

This invention relates to spraying torches for destroying the nests of worms in trees.

It has for its object an improved implement in which is embodied a spray for throwing hydro-carbon fluid, and a torch for firing hydro-carbon fluid after it has been thrown, or during the time of throwing.

In the drawings:—Figure 1, is an elevation of the implement. Fig. 2, is a sectional elevation of the base thereof. Fig. 3, is a vertical section of the torch and the valve by which its fuel supply is controlled. Fig. 4, is a horizontal section of the pump handle.

The implement consists of a tank for receiving hydro-carbon liquid, a conduit for conveying it to its place of use, spraying apparatus terminating the conduit and a torch in proximity to the spraying apparatus which is fed with fuel from the conduit, and with suitable valves for controlling the apparatus.

The tank indicated at 1 is provided with a filling spout 2 and an air compressing pump 3 actuated by a lever 4. The lever 4 comprises a tubular base portion $4^b$ which is pivoted to the rod that actuates the piston of the pump. The handle portion $4^a$ telescopes with the base portion $4^b$. When the pump is not in use the handle $4^a$ may be pushed into the base portion $4^b$. The feed pipe 6 extends into the tank 1 and terminates at the bottom of the tank in a small pocket 7 by means of which the last of the liquid hydro-carbon in the tank may be used although the tank itself may be tilted to a considerable degree at the time such use is desired. At the end of the conduit 6, which is preferably made in lengths 6, $6^a$ and $6^b$ is a spraying nozzle 9, and within the spraying nozzle a branch 10 through which fluid is conveyed to a burner 11. The burner preferably consists of some incombustible material which will absorb a quantity of liquid and the liquid therein will burn with a small flame for a considerable period of time. The passage in the branch 10 is controlled by a valve 12 which may be opened or closed at will. A hand valve 13 on the conduit 6 may be used to control the discharge of liquid, shutting it off at times when it is desired to so shut it off.

In use the spraying end of the torch is placed as near as may be to the part to be drenched with oil and the valve 13 is opened, in which case if fuel under pressure is contained in the tank it will be sprayed with considerable force from the nozzle 9. After the spraying has been completed the torch is lifted slightly and the burner 11 which contains the small flame is applied to the drenched nest with less injurious effect to the tree than a torch of burning material held under it and with more injurious effect to the worms contained in the nest because the spray has drenched and saturated them quite thoroughly, and they are readily destroyed.

The section $6^a$ of the pipe is made removable in order that the length of the torch may be changed at will by extending the section $6^a$ to any desired length. Fuel is placed in the tank through the filling opening 2 and a pressure of air is charged over the fuel by the air pump 3. A handle 14 makes the implement easy to manipulate.

What we claim is:—

1. A spraying torch, having in combination a tank for the reception of liquid, a conduit pipe leading therefrom, a spraying nozzle terminating said conduit pipe, a compression pump arranged to compress air into said tank, a torch between the sprayer and the tank having a feed connection with said conduit, and means for making the flame of the torch constant, substantially as described.

2. A spraying torch, having in combination a tank, a conduit leading therefrom having a nozzle connected thereto, a torch supported on and taking its fuel from said conduit, means for insuring a constant supply of fuel for said torch and means for forcing fuel through said conduit, substantially as described.

3. A spraying torch, having in combination a tank, a conduit leading therefrom, a nozzle connected thereto, a torch having a feed connection to said conduit and supported thereby, absorbent material in said torch adapted to hold a supply of fuel, and means for forcing fuel through said conduit, substantially as described.

4. In a spraying apparatus, a conduit adapted to convey fuel, means for forcing the fuel through said conduit, a nozzle on said conduit, a torch in juxtaposition thereto having a feed connection with said conduit, and a separate valve for controlling said torch, substantially as described.

5. In a spraying apparatus, in combination with means for forcing fuel under pressure, a conduit through which said fuel is forced, means at the end of said conduit for directing said fuel upon an external object, and means near the end of said conduit and separated from said end so as not to ignite the fuel issuing therefrom, and adapted to ignite said fuel only after it has been ejected upon said object, substantially as described.

In testimony whereof, we sign this specification in the presence of two witnesses.

EDWIN F. ROY.
THEODORE ARGLEBEN.

Witnesses:
STUART C. BARNES,
ELLIOTT J. STODDARD.

Copies of this patent may be obtained for five cents each, by addressing the "Commissioner of Patents, Washington, D. C."